United States Patent Office 3,527,857
Patented Sept. 8, 1970

3,527,857
PROCESS FOR PREPARING POLYTETRAFLUORO-
ETHYLENE-CONTAINING POWDER
Herbert Fitz, Burgkirchen (Alz), Germany, assignor to
Farbewerke Hoechst Aktiengesellschaft vormals Mei-
ster Lucius & Bruning, Frankfurt am Main, Germany,
a corporation of Germany
No Drawing. Filed Oct. 11, 1966, Ser. No. 585,766
Claims priority, application Germany, Oct. 26, 1965,
F 47,509
Int. Cl. C08f 3/24, 47/02
U.S. Cl. 264—117                                    9 Claims

ABSTRACT OF THE DISCLOSURE

A process for preparing a polytetrafluoroethylene polymer powder to improve its flow properties and increase its powder density comprising applying mechanical forces on unsintered polytetrafluoroethylene powder in a dispersion consisting of water and an organic liquid capable of wetting polytetrafluoroethylene and soluble in water to at most 15% at temperatures ranging from 0 to 100° C., preferably 10 to 80° C.

---

The present invention provides a process for treating a powder consisting predominantly of polytetrafluoroethylene in order to improve its flow properties and to increase its powder density.

It is known that polytetrafluoroethylene (PTF) can only be processed into shaped structures according to special techniques similar to those applied in powder metallurgy, on account of its high crystallite melting point of 327° C. and its high fusion viscosity. A great number of publications deals with the processing of PTFE-powders into shaped structures such as for example ingots, plates, cylinders, pipes, rods and the like. A process in batches generally used for processing PTFE consists in cold molding PTFE-powder under pressure and sintering at temperatures above 327° C. According to this procedure, it is possible to make shaped structures of small and large sizes. In addition to this and similar processes, there have also been developed continuous processing methods according to which the individual steps, such as cold molding of the powder, sintering and cooling, take place in appropriate devices.

For making shaped structures from PTFE, there are generally used PTFE-powders which, depending on their properties and the field of application, may be divided in about the following groups:

For a better understanding of the present invention, the different PTFE-powders mentioned in Table I are described in short:

Compared to the considerably coarse powders of groups 2 to 4, the powders of group 1, which are usually directly obtained by polymerization, represent a particularity in as far as these powders having a grain diameter less than $1\mu$ (prepared for example, according to U.S. Pat. No. 2,750,350), can only be processed into sintered shaped structures having a layer thickness of about 3 millimeters. On account of this small particle diameter, it is however possible, in contradistinction to the coarse powders of groups 2 to 4, to continuously make shaped structures such as pipes, wire coatings and the like, by cold extrusion while adding appropriate lubricants. These shaped structures are subsequently sintered in usual manner. Coarse-grained PTFE-powders, such as for example those of groups 2 to 4 (see Table I) are usually prepared by grinding PTFE-particles having a grain diameter ranging from about 0.7 to 2.5 millimeters, such as are obtained in the suspension polymerization of tetrafluorethylene.

Only some of the PTFE-powders of groups 2 to 4 show satisfactory properties in practical use. Thus, for example, powders of the type of group 4 possess good flow properties and a high powder density and they can therefore be continuously processed in appropriate devices, but they have the great disadvantage that they can only be processed, generally, into bodies containing undesired pores and holes, owing to the large grain size of the powders. Fine-grained PTFE-powders of group 3, having a grain diameter ranging from 200 to $400\mu$ are a little more favorable than the powders of group 4, since they can be processed into shaped structures without pores and holes, but, in this case, their low powder density and their poor flow properties are of disadvantage, the poor flow hindering the continuous processing. Shaped structures which, in addition to other physical properties such as strength, elongation and dimensional stability, are free from pores and holes, can be made from fine-grained powders of the type of group 2, having a grain diameter ranging from 20 to $100\mu$. As regards their processibility, these powders similar to those of group 3, have extremely poor flow properties and a low powder density, this latter requiring molds of a large volume for the processing.

We have now found a process in which it is possible to provide a PTFE-powder having poor flow properties, with very good flow properties and simultaneously to increase its powder density. The other favorable physical

TABLE I

| PTFE-powder | Diameter of of grain, $\mu$ | Powder density, grams/liter | Flow properties | Field of application |
|---|---|---|---|---|
| 1 | [1] <1 | 300–400 | Bad to medium | Manufact. of thin-walled bodies; contin. cold extrusion possible. |
| 2 | [2] 20–100 | 200–400 | Bad | Manufact. of high-grade shaped struct., plates, foils, etc.; contin. processing impossible. |
| 3 | [2] 200–400 | 450–550 | Medium | General use, shaped struct. of all kinds; contin. processing impossible. |
| 4 | [2] 500–600 | 600–700 | Good | Manufact. of large shaped struct.; contin. processing possible. |

[1] Medium diameter of grain determined by electronic microscope photographs.
[2] Medium diameter of grain determined by wet screen analysis accordin to ASTM-D 1457–62 T.

properties of the PTFE-powder are not adversely affected by the treatment of the invention.

Thus, the present invention provides a process for preparing a polymer powder consisting predominantly of PTFE in order to improve its flow properties and to increase its powder density, which comprises applying mechanical forces on unsintered PTFE-powder prepared in known manner in a dispersion consisting of water and an organic liquid capable of wetting PTFE and soluble in water to at most 15% under the process conditions, at temperatures ranging from 0 to 100° C., preferably 10 to 80° C.

It is known that PTFE which has extremely hydrophobic properties can be wetted by various organic liquids, for example aliphatic and aromatic hydrocarbons and other aromatic compounds, ethers, esters, alcohols and halogenated compounds.

The process of the invention is based on the observation that the hydrophobic property of the PTFE and its ability of being wetted by organic liquids under simultaneous action of mechanical forces can serve to improve the flow properties and the powder density of a PTFE-powder.

The mechanical forces applied according to the invention in a dispersion consisting of water and an organic liquid capable of wetting PTFE, may be for example stirring, shaking, pumping or agitating by supersonant. For preparing powders of particularly good flow properties and of particles having a globular shape, stirring and shaking proved to be particularly effective. The effect occurring consists in the fact that the PTFE-particles in the dispersion hit droplets of the organic dispersion phase capable of wetting PTFE, and are accumulated under the action of the mechanical forces.

Powders consisting predominantly of PTFE according to the invention are polymer-powders consisting of PTFE or of copolymers of tetrafluorethylene with other compounds copolymerizable therewith, for example hexafluoropropylene, vinylfluoride, vinylidenefluoride, trifluorochlorethylene, containing at least 50% by weight of tetrafluoroethylene, as well as mixtures of PTFE with the above-mentioned copolymers or with other compounds. It is, however, particularly advantageous to apply the process of the invention to PTFE-powder.

The process can be carried out so that globular PTFE-particles of completely the same shape and of a desired grain diameter can be formed by applying mechanical forces, for example by stirring. The process of the invention can be controlled in desired manner by varying the amount and the composition of the dispersion and/or the mechanical forces to be applied. The PTFE-powder prepared according to the invention can be worked up in a simple manner.

It is advantageous to operate such as to separate the main amount of the liquid phase from the treated PTFE-powder by decanting, screening or likewise and to dry the powder at temperatures in the range of from 100 to 230° C., as is usual for PTFE-powder. It is understood that the drying temperature has to be adapted to the boiling point of the organic liquid used for the dispersion, that means that it has to be above the boiling point of the organic phase, thus assuring its complete removal.

The dispersion to be used in the process of the invention may be stable or unstable, it may also be formed only during the realisation of the process, meaning that the PTFE-powder to be used, water and the organic liquid are mixed in any order and then the mechanical forces, for example stirring, are applied. It is particularly advantageous according to the invention, first to form the dispersion by stirring and to introduce the PTFE-powder to be prepared into it, while stirring is continued.

According to the process of the present invention, PTFE-powders of differing particle size, for example of grain diameters in the range of less than $1\mu$ to $600\mu$, can generally be treated to improve their powder density and their flow properties. For practical reasons, the process is applied, preferably, to powders having a grain diameter in the range of from 0.01 to $400\mu$. Particularly good results shown by an increase in the powder density of up to 600 grams per liter and more can be obtained with powders having a grain diameter in the range of from 0.01 to $100\mu$. The process of the invention can be carried out continuously or in batches at a temperature ranging from 0 to 100° C., advantageously from 10 to 80° C. For carrying out the process it is a matter of course to use, at the temperatures applied, such organic liquids as are capable of forming aqueous dispersions at these temperatures.

For the preparation of the dispersion it is generally possible to use such liquids which are capable of wetting PTFE and which are soluble in water up to at most 15%, to form the organic phase. Examples of organic compounds used for this purpose are the following:

Aliphatic, cycloaliphatic, aromatic hydrocarbons, preferably gasoline, cyclohexane, benzene, toluene, esters such as butyl acetate, amyl acetate, alcohols such as butanol, hexanol and higher homologs, ethers such as diethyl ether, di-isopropyl ether, halogenated compounds such as chloroform, perchlorethylene and chlorobenzene.

As regards the amount of dispersion to be used per unit of amount of PTFE-powder, a weight ratio ranging from 1:1 to 1:10, preferably of 1:5 has proved to be favorable according to the invention. Depending on type and density of the organic liquid used for forming the dispersion, its percent proportion in the total amount of the dispersion may vary. According to the invention, a content in the range of from 5 to 50, preferably from 5 to 30% by weight of organic liquid in the total weight amount of dispersion has proved to be advantageous.

The time of treatment necessary for yielding good results by applying mechanical forces on mixtures of PTFE-powder with the dispersions used, vary within wide limits depending on the nature and kind of the mechanical forces. For example, when they are applied to the system by stirring, a time of treatment ranging from 5 to 30 minutes for the PTFE-powder in the dispersion generally suffice completely to yield the desired effect.

It has often been tried to improve the flow properties and the powder density of PTFE-powders. For example U.S. Pat. No. 3,152,201 describes a process for increasing the powder density and improving the flow properties of PTFE-powders by heating the pulverulent PTFE in a finely distributed form to a temperature above its melting point of 327° C. and by then cooling the agglomerated material and finally grinding it to the desired grain diameter, at a temperature below 19° C. PTFE-powders prepared in such a manner and already pre-sintered are in the first place used for extrusion molding. Compared with the process of the present invention, this process has some essential disadvantages.

Apart from the considerably increased technical expenditure such as heating to high temperatures and subsequently grinding, required by the known process, "pre-sintered" PTFE-powders prepared in this manner are, as known from experience, usable only for a processing by sintering under pressure. Shaped structures which have been made from powders in usual manner by "pressure-less sintering" ("free sintering") according to U.S. patent mentioned, are always porous, contain holes and are not suitable for making high-quality finished products.

Another known process of this kind is disclosed in U.S. Pat. No. 3,087,921. According to this process, PTFE-powder is molded at temperatures ranging, for example from 150 to 250° C. and at pressures in the range of from 70 to 210 kp./cm.², then the pre-molded material is reduced to the desired grain diameter by crushing, for example by grinding it in a wet state. This process requiring also a considerable technical expenditure, can also not be compared with the process of the invention as regards the properties of the PTFE-powders obtained or of the shaped articles prepared from them. Thus, the treatment under pressure and the subsequent crushing provide powders consisting of particles having a differing accumulation. This has its effects, particularly when shaped parts having thin walls are made, such as plates, pipes and the like, in as far as considerable inhomogeneities occur and these parts are not suitable in many fields of application, for example in the field of electrical engineering.

According to the process of the invention, it is possible, for example, to bring the fine-grained PTFE-powders having excellent properties and a grain diameter in the range of from less than 1 to 100μ, into an excellently flowable form and to increase their powder density. These improved powders can be processed into shaped articles in a perfect manner, continuously as well as in batches. Owing to the extraordinarily high powder density of the PTFE-powders of up to 950 grams per liter and more, obtainable according to the invention, it is possible to process such powders in a far more economical manner than has been possible with powders having poor flow properties and a powder density ranging from about 200 to 400 grams per liter. The excellent flow properties and the high powder density of the PTFE-powders prepared according to the invention are the reasons why the powder used can be much more easily distributed in the mold, when making shaped articles having thin walls and a certain length, such as pipes, than the powders hitherto used, thus yielding shaped articles particularly free from pores and holes, which are gaining importance as insulators in the field of electrical engineering.

On account of their high powder density and their good flow properties, the PTFE-powders of the invention can also be processed into cylindrical shaped articles which, after having been sintered, serve for the manufacture of first-grade PTFE-foils by rotary cutting.

The process of the invention may not only be applied to PTFE-powders having a determined initial grain diameter; naturally, it is self-evident that the process is above all of interest for those PTFE-powders which yield particularly high-grade shaped articles on account of their small primary grain diameter. As already mentioned, the process can be carried out continuously as well as in batches. The dispersions used according to the invention may contain ionic or anionic emulsifiers, for example p-octyl- or p-nonylphenol-polyethylene glycol ether. The following Example 1 and the results of Examples 1 to 15 mentioned in Table 2 serve to illustrate the invention, but they are not intended to limit it thereto.

For determining the flow properties of the PTFE-powders, 50 grams each of a PTFE-powder were filled into a funnel of polyethylene having an angle of inclination of 60°, which was provided with an outlet tube having an internal diameter of 12.5 millimeters and a length of 5 millimeters. This outlet was at first closed. Then the funnel was given a horizontal impact of an oscillation of 50 Hz. and an amplitude of ±1 millimeter, the outlet was simultaneously opened and the discharging time of the 50 grams of powder which had been filled in, was measured. The powder density of the samples was found according to Germany Industrial Standards (DIN) 53,468, the tensile strength and the tensile elongation were measured in test plates according to ASTM D–1457–62T.

EXAMPLE 1

An open glass vessel of a globular shape having a capacity of 20 liters was used. This vessel was provided with a stirring shaft arranged in the center of the vessel and to the end of which a three-blade propeller having a diameter of 80 millimeters was fixed at a distance of 60 millimeters from the bottom of the vessel. At a temperature of 25° C., this vessel was filled with 6,000 grams of water and 750 grams of gasoline having a boiling point of 60 to 150° C. The two-phase system was intimately mixed within 5 minutes at 25° C. by stirring at 1,800 rotations per minute and while the stirrer maintained the same number of rotations, 3,000 grams of pulverulent PTFE was introduced within 3 minutes into the dispersion formed. The dispersion consisting of water, gasoline and PTFE-powder, was intimately stirred for another 30 minutes at 25° C. at 1,800 rotations per minute, whereupon, already after about 5 minutes, a formation of particles of a distinctly globular shape could be observed at the wall of the glass vessel. Subsequently, the obtained fine-grained wet PTFE-powder having good flow properties was separated from the main amount of the liquid by decanting and dried in a drying cabinet at 200° C. The material showed a pronounced globular structure under the microscope. The properties of starting and final products are mentioned in the following table:

| PTFE-powder | Grain diameter medium, μ | Powder density, g./l. | Tensile strength, kp./cm.$^2$ | Tensile elongation, percent | Flow property, sec. |
| --- | --- | --- | --- | --- | --- |
| Starting product | 60 | 350 | 260 | 390 | Above 60. |
| Final product | 200 | 910 | 275 | 400 | 2.5. |

EXAMPLES 2–15

Examples 2 to 15 mentioned in Table 2 were carried out by mixing PTFE-powder and dispersion in a 500 milliliter cylindrical vessel having an internal diameter of 75 millimeters, provided with a three-winked propeller stirrer of a diameter of 40 millimeters, at 1,700 rotations per minute. First, the organic phase and the total amount of water were emulsified by means of the stirrer within 3 minutes and, within about 1 minute, the whole amount of PTFE-powder was introduced into the dispersion. The working up was carried out in a manner analogous to that of Example 1.

TABLE II

| Ex. No. | Composition of dispersion ||| PTFE Amount, grams | Test conditions || Starting material |||||| Treated material ||||| 
|---|---|---|---|---|---|---|---|---|---|---|---|---|---|---|---|---|
| | Water amount, grams | Organic phase |||| | | | | | | | | | | |
| | | Amount, grams | Type | | Temp., °C | Time, min. | Dia. of grain, μ | P.d., g./l. | T. str., kg./cm.² | T. el., percent | Fl. p., sec. | Dia. of grain, μ | P.d., g./l. | T. str., kg./cm.² | T. el., percent | Fl. p., sec. |
| 2 | 200 | 30 | n-Octane | 100 | 25 | 5 | 0.05 | 430 | 215 | 425 | >60 | 200 | 660 | 249 | 450 | 6 |
| 3 | 200 | 35 | n-Butanol | 100 | 25 | 10 | 50 | 360 | 240 | 390 | >60 | 200 | 460 | 237 | 390 | 3 |
| 4 | 200 | 35 | n-Hexanol | 100 | 25 | 10 | 50 | 360 | 240 | 390 | >60 | 250 | 580 | 250 | 410 | 3 |
| 5 | 200 | 35 | Butylacetate | 100 | 25 | 10 | 50 | 360 | 240 | 390 | >60 | 180 | 540 | 274 | 450 | 3 |
| 6 | 200 | 30 | Benzene | 100 | 25 | 5 | 50 | 360 | 240 | 390 | >60 | 250 | 730 | 276 | 470 | 6 |
| 7 | 200 | 50 | Toluene | 100 | 25 | 5 | 50 | 360 | 240 | 390 | >60 | 230 | 690 | 264 | 450 | 3 |
| 8 | 200 | 50 | Chloroform | 100 | 25 | 15 | 50 | 360 | 240 | 390 | >60 | 270 | 700 | 260 | 440 | 2.5 |
| 9 | 200 | 25 | Isopropylether | 100 | 25 | 5 | 50 | 360 | 230 | 350 | >6 | 260 | 690 | 304 | 450 | 3.5 |
| 10 | 200 | 20 | n-Hexane | 100 | 25 | 5 | 350 | 500 | 250 | 390 | >60 | 400 | 800 | 240 | 340 | 4 |
| 11 | 200 | 30 | Gasoline¹ | 100 | 25 | 15 | 50 | 250 | 240 | 390 | >60 | 260 | 870 | 255 | 410 | 4.5 |
| 12 | 200 | 30 | ...do... | 100 | 25 | 15 | 100 | 360 | 255 | 390 | >60 | 200 | 890 | 263 | 430 | 2.3 |
| 13 | 200 | 35 | ...do... | 100 | 25 | 15 | 50 | 380 | 240 | 420 | >30 | 270 | 890 | 269 | 420 | 2.3 |
| 14 | 200 | 30 | ...do... | 100 | 60 | 30 | 50 | 380 | 240 | 390 | >60 | 230 | 890 | 278 | 410 | 2 |
| 15 | 200 | 45 | ...do... | 100 | 25 | 30 | 80 | 380 | 275 | 385 | >60 | 400 | 810 |  | 390 | 3 |

¹ B.P. = 80–120 degrees.
T. str. = tensile strength, t. el. = tensile elongation, fl. p. = flow properties, p.d. = powder density.

I claim:
1. A process for preparing a polymer powder consisting predominantly of polytetrafluoroethylene which comprises applying mechanical forces on unsintered polytetrafluorethylene powder in a dispersion consisting of water and an organic liquid and capable of wetting polytetrafluorethylene and being soluble in water to at most 15% under the process conditions at a temperature in the range of from 0 to 100° C.

2. A process of claim 1 wherein a polytetrafluorethylene powder having a medium particle size of up to 400μ is used.

3. A process of claim 1 wherein the temperature is 10 to 80° C.

4. A process of claim 1 wherein the proportion by weight of the polytetrafluorethylene powder to the dispersion is 1:1 to 1:10.

5. A process of claim 1, wherein the proportion by weight of the polytetrafluorethylene powder to the dispersion is 1:5.

6. A process of claim 1 wherein a dispersion is used which consists of 5 to 15% by weight of the organic liquid.

7. A process of claim 1 wherein a dispersion is used which consists of 5 to 30% of the organic liquid.

8. A process of claim 1 wherein the mechanical forces are applied by means of a stirrer.

9. A process of claim 1, wherein the mechanical forces are applied by means of shaking.

References Cited

UNITED STATES PATENTS 3,265,679   8/1966   Black et al. _____ 260—92.1

JOSEPH L. SCHOFER, Primary Examiner

J. A. DONAHUE, Jr., Assistant Examiner

U.S. Cl. X.R.

260—87.5, 87.7, 92.1